US008816224B2

(12) United States Patent
Yamamoto et al.

(10) Patent No.: US 8,816,224 B2
(45) Date of Patent: Aug. 26, 2014

(54) DROPLET DISCHARGE DEVICE INCLUDING WEIGHT MEASUREMENT DEVICE

(75) Inventors: Takatoshi Yamamoto, Nagano (JP); Kenji Kojima, Nagano (JP)

(73) Assignee: Seiko Epson Corporation, Tokyo (JP)

( * ) Notice: Subject to any disclaimer, the term of this patent is extended or adjusted under 35 U.S.C. 154(b) by 902 days.

(21) Appl. No.: 12/986,628

(22) Filed: Jan. 7, 2011

(65) Prior Publication Data
US 2011/0100725 A1    May 5, 2011

Related U.S. Application Data

(62) Division of application No. 12/142,407, filed on Jun. 19, 2008, now Pat. No. 7,893,368.

(30) Foreign Application Priority Data

Jul. 3, 2007  (JP) .................................. 2007-174861

(51) Int. Cl.
*G01G 21/28* (2006.01)
*B41J 2/01* (2006.01)
*B41J 2/17* (2006.01)
*B41J 2/045* (2006.01)

(52) U.S. Cl.
CPC .......... *B41J 2/04581* (2013.01); *B41J 2/04506* (2013.01); *B41J 2/0456* (2013.01)
USPC ............. 177/116; 177/145; 177/238; 222/77; 427/8

(58) Field of Classification Search
USPC .......... 177/116, 145, 180, 238; 702/173–175; 700/240; 141/83; 427/8
See application file for complete search history.

(56) References Cited

U.S. PATENT DOCUMENTS

| | | | |
|---|---|---|---|
| 4,291,775 | A | 9/1981 | Collins |
| 4,666,005 | A | 5/1987 | Komoto et al. |
| 4,763,460 | A | 8/1988 | Higo et al. |
| 4,789,034 | A | 12/1988 | Luchinger et al. |
| 4,821,821 | A | 4/1989 | Kelley |
| 4,921,058 | A | 5/1990 | Pally et al. |
| 5,038,839 | A | 8/1991 | Morimoto et al. |
| 5,583,322 | A | 12/1996 | Leisinger et al. |
| 5,617,648 | A | 4/1997 | Leisinger et al. |
| 5,835,982 | A | * 11/1998 | Lanaro et al. ................. 177/145 |

(Continued)

FOREIGN PATENT DOCUMENTS

| | | |
|---|---|---|
| CN | 2483701 Y | 3/2002 |
| JP | 62-184436 U | 11/1987 |

(Continued)

*Primary Examiner* — Randy W Gibson
(74) *Attorney, Agent, or Firm* — Global IP Counselors, LLP

(57) ABSTRACT

A droplet discharge device for discharging a liquid material onto a workpiece includes a droplet discharge head, a guide rail, a stage, a maintenance stage and a weight measurement device. The droplet discharge head discharges the liquid material. The guide rail extends in a prescribed direction. The stage, on which the workpiece is mounted, moves on the guide rail along the prescribed direction. The maintenance stage moves on the guide rail along the prescribed direction. The weight measurement device is disposed on the maintenance stage, the weight measurement device measuring weight of droplets discharged from the droplet discharge head and is able to be disposed at a location opposite the droplet discharge head when the maintenance stage moves along the guide rail.

5 Claims, 12 Drawing Sheets

(56) References Cited

U.S. PATENT DOCUMENTS

| | | |
|---|---|---|
| 6,023,666 A * | 2/2000 | Jiang et al. .................... 702/173 |
| 6,061,608 A * | 5/2000 | Moldavsky ................... 700/240 |
| 6,302,577 B1 | 10/2001 | Jennings et al. |
| 6,455,787 B1 | 9/2002 | Ingenhoven |
| 6,504,112 B1 | 1/2003 | Luebke et al. |
| 6,515,238 B1 | 2/2003 | Martens et al. |
| 6,566,614 B1 | 5/2003 | Fluckiger et al. |
| 6,674,022 B2 | 1/2004 | Fermier et al. |
| 6,769,462 B2 * | 8/2004 | Larson et al. ................... 141/83 |
| 7,893,368 B2 * | 2/2011 | Yamamoto et al. ........... 177/180 |
| 8,168,250 B2 * | 5/2012 | Kojima .............................. 427/8 |

FOREIGN PATENT DOCUMENTS

| | | |
|---|---|---|
| JP | 62-273456 A | 11/1987 |
| JP | 05-322638 A | 12/1993 |
| JP | 07-167704 A | 7/1995 |
| JP | 2004-191308 A | 7/2004 |
| JP | 2004-209429 A | 7/2004 |

* cited by examiner

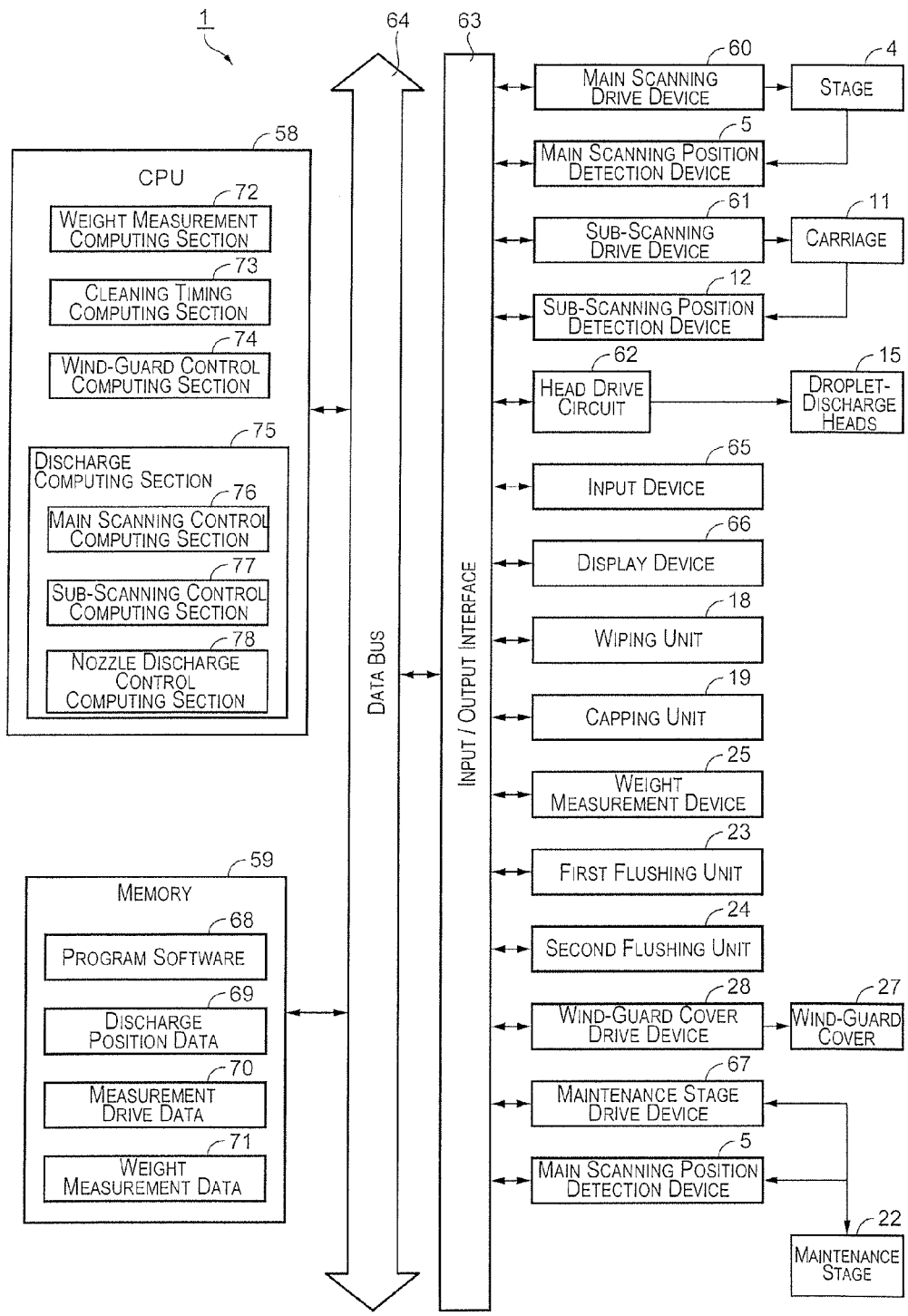
F I G. 6

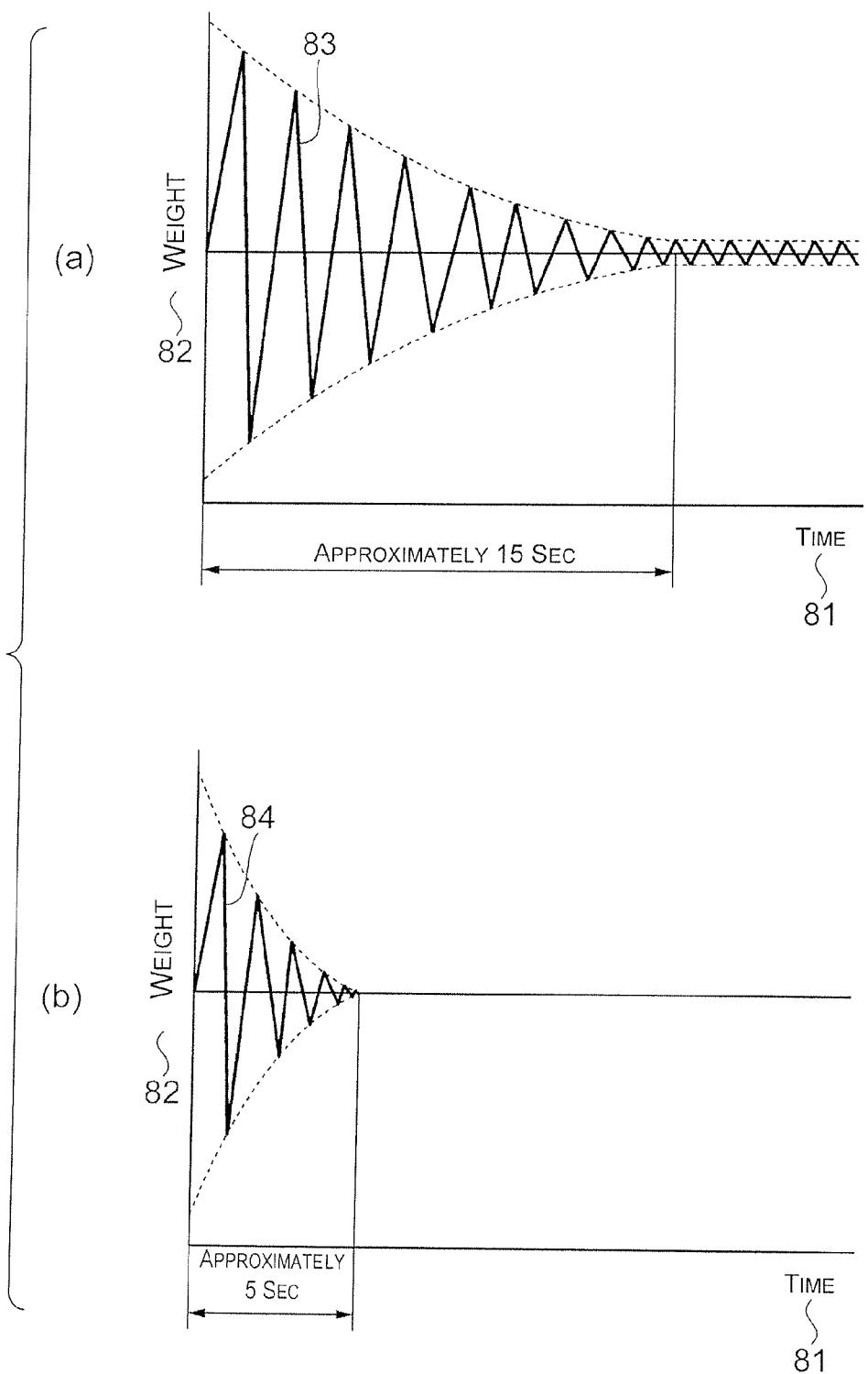
F I G. 10

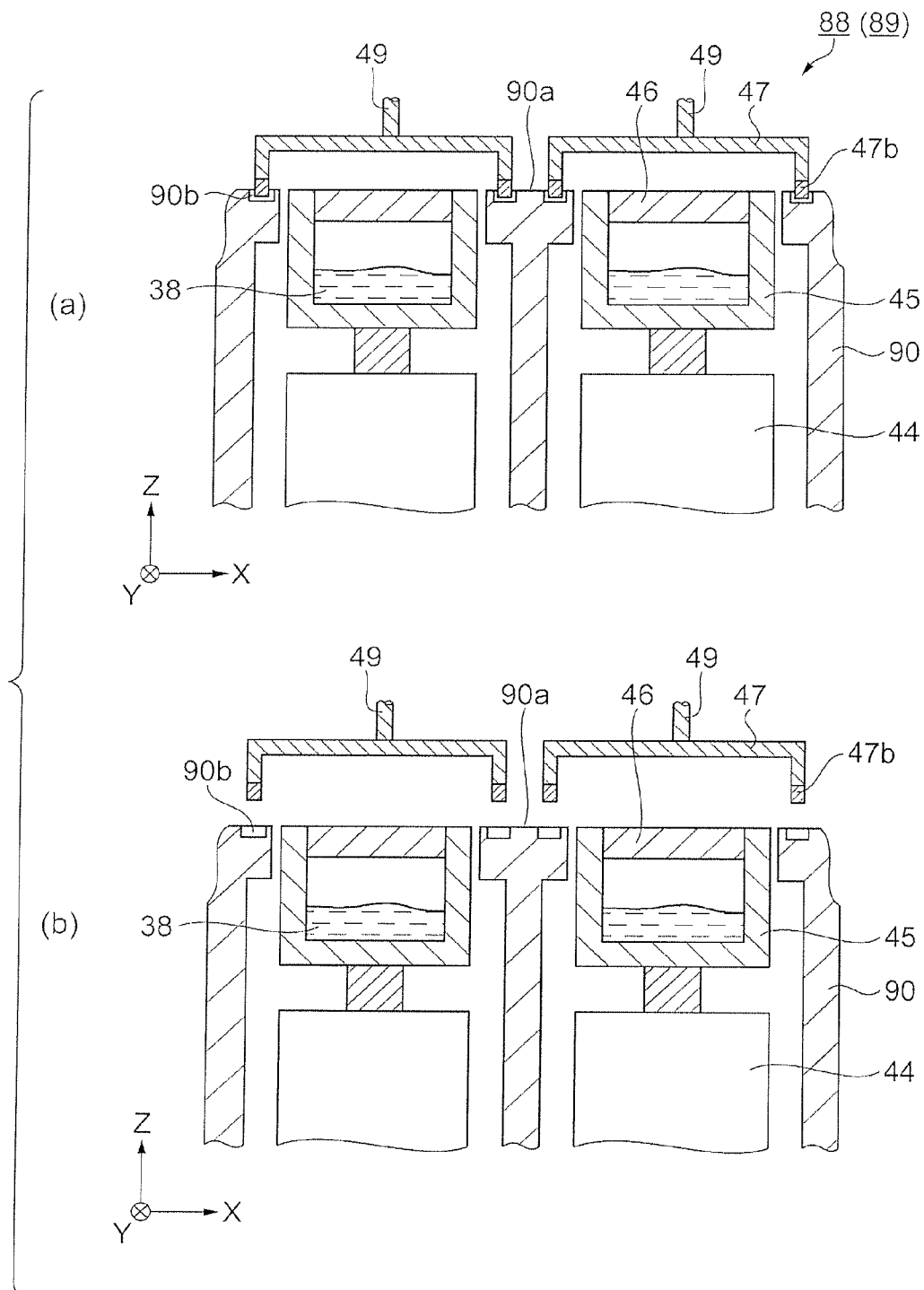
F I G. 12

DROPLET DISCHARGE DEVICE INCLUDING WEIGHT MEASUREMENT DEVICE

CROSS-REFERENCE TO RELATED APPLICATIONS

This application is a divisional application of U.S. patent application Ser. No. 12/142,407 filed on Jun. 19, 2008. The entire disclosure of U.S. patent application Ser. No. 12/142,407 is hereby incorporated herein by reference. This application claims priority to Japanese Patent Application No. 2007-174861 filed on Jul. 3, 2007. The entire disclosure of Japanese Patent Application No. 2007-174861 is hereby incorporated herein by reference.

BACKGROUND

1. Technical Field

The present invention relates to a droplet discharge device. More particularly, the present invention relates to a device and method for conducting precise measurements without being affected by an air flow.

2. Related Art

In conventional practice, droplet discharge devices for discharging droplets by using an inkjet system are known as devices for discharging droplets onto a workpiece. A droplet discharge device comprises a carriage on which an inkjet head (hereinafter referred to as droplet-discharge head) is mounted, and a table for carrying and moving a substrate or another workpiece. Droplets are discharged onto the workpiece while the droplet-discharge head and the workpiece are moved relative to each other, thus coating the workpiece.

Japanese Laid-Open Patent Application No. 2004-209429 discloses a method for precisely controlling the discharged amount in this type of droplet discharge device. According to this method, a droplet discharge device coats a workpiece while controlling the sprayed amount of functional liquid by adjusting the discharged amount following a measurement of the amount discharged by a droplet-discharge head provided with a weight measurement device. Since the amount discharged by the droplet-discharge head is susceptible to the effects of the ambient temperature, the temperature of the droplet discharge device is controlled by creating a flow of a gas (air) whose temperature is controlled by an air control device.

SUMMARY

In the conventional methods as described above, an air flow is created by an air control device. The weight measurement device measures the weight of a container holding the measurement object while air is flowing. At this time, a problem is encountered in that contact between the air flow and the container causes the measurement of the measurement object to fluctuate and that the weight cannot be precisely measured.

Accordingly, one object of the present invention is to resolve at least some of the problems described above.

According to one aspect of the present invention, a droplet discharge device for discharging a liquid material onto a workpiece includes a droplet discharge head, a guide rail, a stage, a maintenance stage and a weight measurement device. The droplet discharge head discharges the liquid material. The guide rail extends in a prescribed direction. The stage, on which the workpiece is mounted, moves on the guide rail along the prescribed direction. The maintenance stage moves on the guide rail along the prescribed direction. The weight measurement device is disposed on the maintenance stage, the weight measurement device measuring weight of droplets discharged from the droplet discharge head and is able to be disposed at a location opposite the droplet discharge head when the maintenance stage moves along the guide rail.

BRIEF DESCRIPTION OF THE DRAWINGS

Referring now to the attached drawings which form a part of this original disclosure:

FIG. 6 is an electric control block diagram of the droplet discharge device according to the first embodiment;

FIG. 10 is a pair of diagrammatic graphs (a) and (b) for describing the effects of the transverse air-blocking parts according to the first embodiment;

FIG. 12 is a pair of diagrams (a) and (b) showing partial schematic cross-sectional views of the structure of the wind-guard covers according to a third embodiment.

DETAILED DESCRIPTION OF EXEMPLARY EMBODIMENTS

Figure 1:
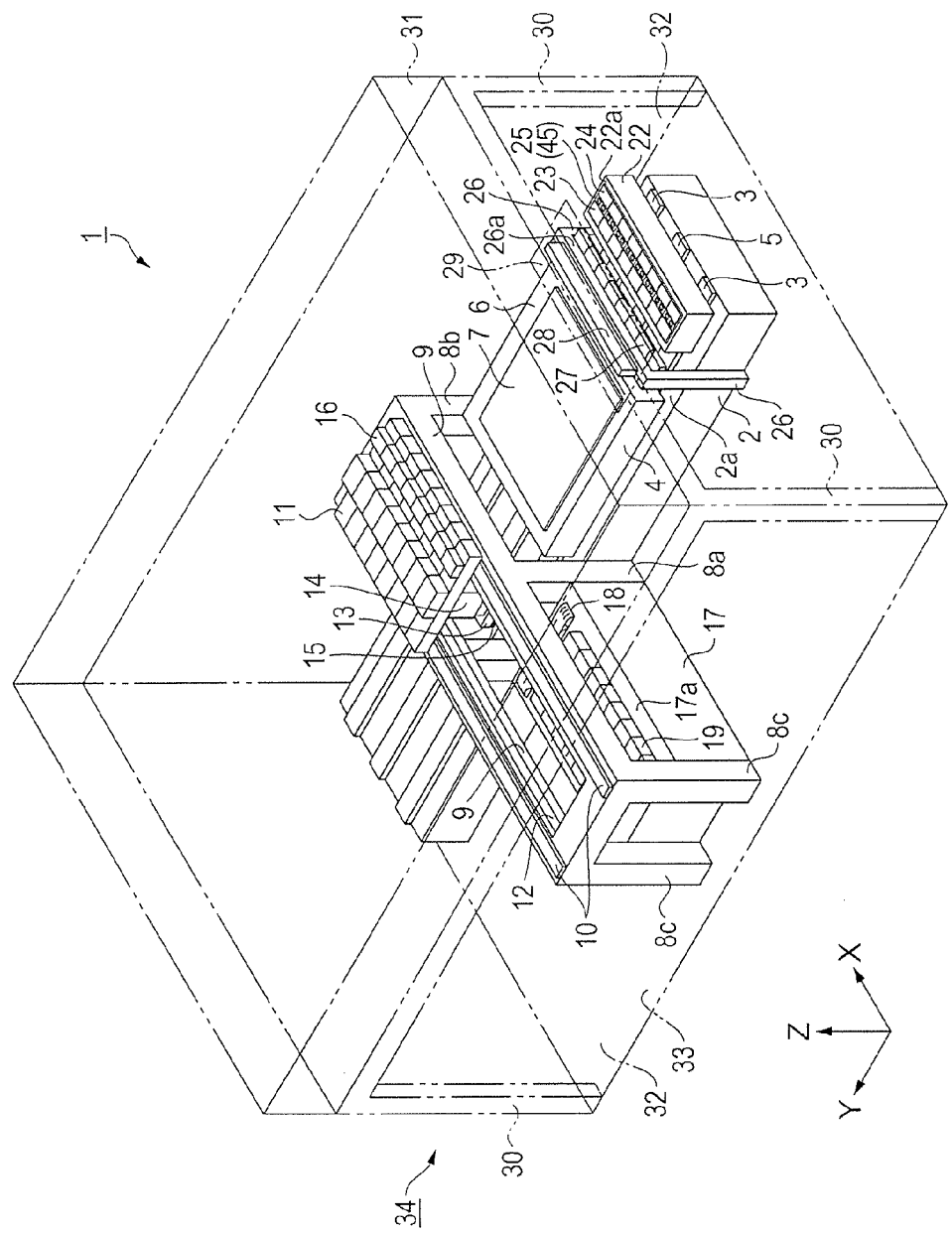
FIG. 1 is a schematic perspective view showing the configuration of a droplet discharge device having a weight measurement device according to the first embodiment.

The following is a description, made with reference to the drawings, of an embodiment in which the weight of a functional liquid is measured without being affected by air flow. The members in the drawings are each displayed in a different scale so as to be shown in a size recognizable in the drawings.

First Embodiment

In the present embodiment, a characteristic example of a droplet discharge device, and a case of measuring a functional liquid discharged using this droplet discharge device, are described with reference to FIGS. 1 through 10.

First, a droplet discharge device 1 for discharging droplets to coat a workpiece will be described according to FIGS. 1 through 6. Various devices can be used for the droplet discharge device, but a conventional inkjet device is preferred. The inkjet device is configured and arranged to discharge miniscule droplets and is therefore suitable for fine processing.

FIG. 1 is a schematic perspective view showing the configuration of the droplet discharge device. The functional liquid is discharged and sprayed by the droplet discharge device 1. The droplet discharge device 1 has a base 2 formed in the shape of a rectangular parallelepiped, as shown in FIG. 1. In the present embodiment, the longitudinal direction of the base 2 is the Y direction (one example of a prescribed direction), and the direction orthogonal to the Y direction is the X direction.

A pair of convex guide rails 3 extending in the Y direction is provided across the entire width in the Y direction of a top surface 2a of the base 2. On the top side of the base 2 is mounted a stage 4 as a table having a translation mechanism (not shown) that corresponds to the guide rails 3. The translation mechanism of the stage 4 is a screw-based translation mechanism having, e.g., screw shafts (drive shafts) extending in the Y direction along the guide rails 3, and ball nuts that are threaded on the screw shafts. The drive shafts are connected to a Y-axis motor (not shown) that receives specific pulse signals and rotates forward and in reverse in step units. When a drive signal corresponding to a specific number of steps is inputted to the Y-axis motor, the Y-axis motor rotates forward or in reverse, and the stage 4 moves forward or backward (scans in the Y direction) at a specific speed along the Y direction in an amount equivalent to the number of steps.

Furthermore, a main scanning position detection device 5 is disposed parallel to the guide rails 3 on the top surface 2a of the base 2, whereby the position of the stage 4 can be measured.

A mounting surface 6 is formed on the top surface of the stage 4, and a substrate suction chucking mechanism (not shown) is provided on the mounting surface 6. When a substrate 7 as a workpiece is mounted on the mounting surface 6, the substrate 7 is positioned and fixed in place at a specific position on the mounting surface 6 by the substrate chucking mechanism.

A plurality of support stands 8a and 8b is provided upright symmetrically on either side of the base 2 as seen in the X-direction, and a guide member 9 extending in the X direction is provided between the support stands 8a and 8b. The guide member 9 is formed extending in the direction opposite the X direction, and a plurality of support stands 8c are provided upright at an end of the guide member 9. The support stands 8a through 8c are designed to support the guide member 9.

A pair of convex guide rails 10 extending in the X direction is provided across the entire width in the X direction of the top side of the guide member 9. A carriage 11 moveably disposed along the guide rails 10 is configured from eight carriages, and the carriages 11 have a translation mechanism which enables the carriages 11 to move independently. The translation mechanism is a screw-based movement mechanism having, e.g., screw shafts (drive shafts) extending in the X direction along the guide rails 10, and ball nuts that are threaded on the screw shafts. The drive shafts are connected to an X-axis motor (not shown) that receives specific pulse signals and rotates forward and in reverse in step units. When a drive signal corresponding to a specific number of steps is inputted to the X-axis motor, the X-axis motor rotates forward or in reverse, and the carriage 11 moves forward or backward (scan in the X direction) along the X direction in an amount equivalent to the number of steps. A sub-scanning position detection device 12 is disposed on the side surface of the guide member 9, and this device allows the positions of the carriages 11 to be measured.

A head unit 13 and a raising/lowering device 14 for raising and lowering the head unit 13 are disposed on the underside (the side nearer the stage 4) of the carriage 11, and a convex droplet-discharge head 15 is provided on the bottom surface of the head unit 13. A storage tank 16 is provided on the top side of the carriage 11, and the storage tank 16 and droplet-discharge head 15 are connected by a tube (not shown). The tube is configured and arranged to supply the functional liquid stored in the storage tank 16 to the droplet-discharge head 15.

A maintenance stand 17 is disposed between the support stands 8a and the support stands 8c, and a wiping unit 18 and capping unit 19 are disposed on the top surface 17a of the maintenance stand 17. The movement of the carriage 11 allows the droplet-discharge head 15 to move to a location opposite the wiping unit 18 or the capping unit 19.

The wiping unit 18 is a device for wiping a nozzle plate provided with nozzles in the droplet-discharge head 15. The nozzle plate is a member disposed on the droplet-discharge head 15 on the side facing the substrate 7. When droplets adhere to the nozzle plate, there is contact between the substrate 7 and the adhered droplets, and the droplets are deposited at unintended locations on the substrate 7.

Furthermore, when droplets adhere to the peripheries of the nozzles, there is contact between the discharged droplets and the adhered droplets, and the trajectories of the ejected droplets are sometimes curved. At this time, the sprayed locations are not the locations that were intended to be sprayed. By wiping the nozzle plate, the wiping unit 18 prevents droplets from adhering to unintended locations on the substrate 7.

The capping unit 19 is a device having the functions of fitting a cap over the droplet-discharge head 15 and absorbing the functional liquid in the droplet-discharge head 15. The droplets discharged from the droplet-discharge head 15 are sometimes volatile, and when the functional liquid solvent inside the droplet-discharge head 15 vaporizes through the nozzles, the viscosity of the functional liquid changes, and the nozzles are sometimes clogged. By fitting a cap over the droplet-discharge head 15, the capping unit 19 prevents the nozzles from clogging.

Furthermore, when solid matter is admixed to the droplet-discharge head 15 and droplets cannot be discharged, the functional liquid and solid matter inside the droplet-discharge head 15 are absorbed and removed. The problem of nozzle clogging is thus resolved.

A maintenance stage 22 as a movement device is disposed on the top side of the base 2 and on one side (the right side in the drawing) of the stage 4; and a first flushing unit 23 (discharged-liquid receiver), a second flushing unit 24 (discharged-liquid receiver), and a weight measurement device 25 are disposed on the top surface 22a of the maintenance stage 22.

The maintenance stage 22 is positioned over the guide rails 3 and has a translation mechanism similar to that of the stage 4. The position of the maintenance stage 22 is detected using the main scanning position detection device 5, and the maintenance stage 22 is moved by the translation mechanism, whereby the maintenance stage 22 can be moved to and stopped at a specific position. The maintenance stage 22 then moves along the guide rails 3, whereby the first flushing unit 23, the second flushing unit 24, and the weight measurement device 25 can be disposed at a location opposite the droplet-discharge head 15.

The first flushing unit 23 and the second flushing unit 24 are devices that receive the droplets discharged from the droplet-discharge head 15 when the flow channels in the droplet-discharge head 15 are cleaned. When the functional liquid in the droplet-discharge head 15 vaporizes, the functional liquid becomes more viscous and therefore difficult to discharge. In this case, droplets are discharged from the droplet-discharge head 15 to clean the droplet-discharge head 15 in order to remove the more viscous functional liquid from the droplet-discharge head 15. The function of receiving these droplets is performed by the first flushing unit 23 and the second flushing unit 24.

A plurality of electronic scales 44 (FIG. 3) (sixteen in this example) is disposed on the weight measurement device 25, and a catch pan 45 (FIG. 3) is disposed on each electronic scale 44. One row of electronic scales 44 is disposed in alignment in the X direction. Droplets are discharged from the droplet-discharge head 15 onto the catch pans 45, and the electronic scales 44 measure the weight of the droplets. The catch pans 45 have a sponge-form absorptive material and are designed to prevent the discharged droplets from splashing out of the catch pans 45. The electronic scales 44 measure the weight of the catch pans 45 before and after the droplet-discharge head 15 discharges droplets. The weight of the discharged droplets can be measured by calculating the difference in the weight of the catch pans 45 before and after discharge.

The first flushing unit 23 and the second flushing unit 24 are disposed on the sides of the weight measurement device 25. While part of the droplet-discharge head 15 is discharging onto the catch pans 45, the rest of the droplet-discharge head 15 can be positioned at a location opposite the first flushing unit 23 or the second flushing unit 24, where droplets are discharged.

A gate-shaped support stand 26 is provided upright so as to span from the two X direction sides of the base 2 to the top side at a location near the maintenance stage 22 of the base 2. A wind-guard cover 27 is disposed on the underside of a substantially horizontal bridge part 26a in the support stand 26, and a wind-guard cover drive device 28 as a raising/lowering device is disposed on the top side of the bridge part 26a. The wind-guard cover drive device 28 is configured and arranged to selectively raise/lower (elevate) the wind-guard cover 27 so that a relative position of the wind-guard cover 27 with respect to the catch pans 45 is switched between a proximal position (e.g., FIG. 3) and a remote position (e.g., FIG. 4). A windbreak part 29 is disposed on the top surface of the wind-guard cover drive device 28.

The droplet discharge device 1 has a plurality of support pillars 30 disposed at the four corners, respectively, and an air control device 31 (e.g., air conditioning device) disposed at the top (the top side in the diagram). The air control device 31 has a fan, a filter, a cooling/heating device, a humidity adjustment device, and other conventional components. The fan (air-blowing device) takes in ambient air and passes the air through the filter, whereby dust and debris are removed from the air, and purified air is supplied.

The cooling/heating device is a device for controlling the temperature of the supplied air so as to maintain the ambient temperature of the droplet discharge device 1 within a specific temperature range. The humidity adjustment device is a device for dehumidifying or humidifying the air to control the humidity of the supplied air so as to maintain the ambient humidity of the droplet discharge device 1 within a specific humidity range.

A sheet 32 is disposed between the four support pillars 30 and is designed to block the flow of air. Air supplied from the air control device 31 flows from the air control device 31 toward the floor 33 (in the direction opposite the Z direction in the drawing), and dust or debris in the space enclosed in the sheet 32 flows toward the floor 33. Dust or debris thereby does not readily adhere to the substrate 7.

Furthermore, the sheet 32 forms a chamber 34 and limits the flow of air between the interior and exterior of the chamber 34, thereby making it less likely that the temperature and humidity in the chamber 34 will be affected by the exterior of the chamber 34. The air control device 31 readily controls the temperature and humidity of the chamber 34.

Some of the air flow created the air control device 31 flows toward the weight measurement device 25. The air flow blowing toward the weight measurement device 25 strikes the windbreak part 29 and slows down. Furthermore, placement of the wind-guard cover 27 on the weight measurement device 25 makes it more difficult for the air flow to strike the weight measurement device 25.

Figure 2A:
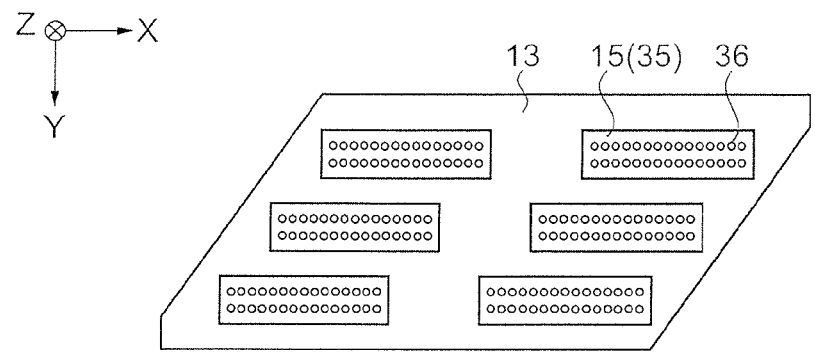
FIG. 2A is a schematic plan view showing a head unit of the droplet discharge device according to the first embodiment.

FIG. 2A is a schematic plan view showing the head unit. On a single head unit 13, three droplet-discharge heads 15 are aligned in one row and are formed in an arrangement diagonal to the Y direction, and two of these rows are arranged as shown in FIG. 2A. A nozzle plate 35 is disposed on the surface of each droplet-discharge head 15, and a plurality of nozzles 36 is formed on each nozzle plate 35. The number of nozzles 36 can be set in accordance with the discharge pattern and the size of the substrate 7. In the present embodiment, e.g., two rows of nozzles 36 are formed on one nozzle plate 35, with fifteen nozzles 36 arranged in each row.

Figure 2B:
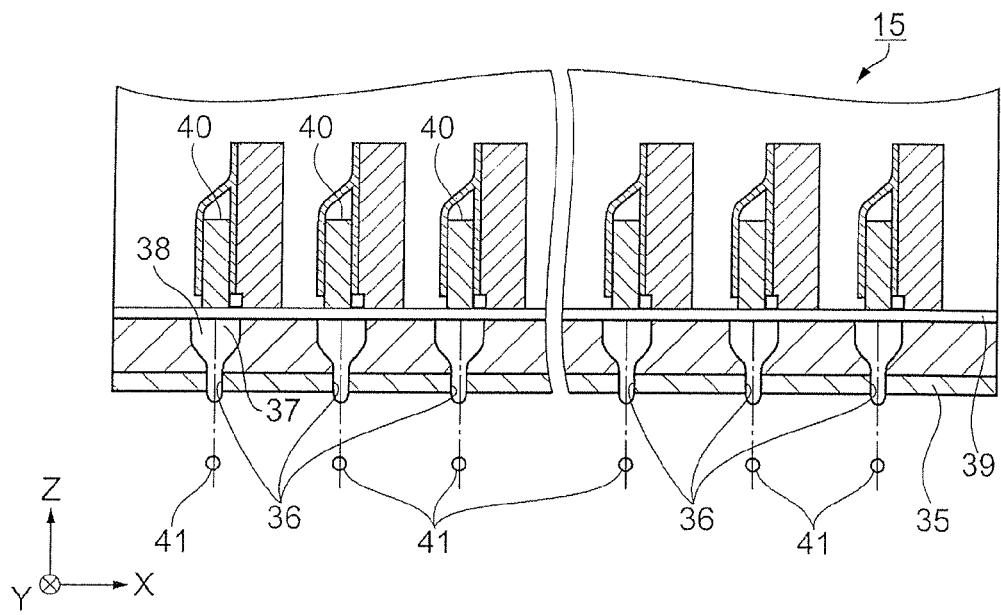
FIG. 2B is a partial schematic cross-sectional view showing the structure of a droplet-discharge head of the head unit according to the first embodiment.

FIG. 2B is a partial schematic cross-sectional view showing the structure of a droplet-discharge head. A droplet-discharge head 15 has a nozzle plate 35, and nozzles 36 are formed on the nozzle plate 35, as shown in FIG. 2B. A plurality of cavities 37 for communicating with the nozzles 36 is formed in the top side of the nozzle plate 35 at positions corresponding with the nozzles 36. Functional liquid 38 as a measured substance, as well as a liquid material held in the storage tank 16, is supplied to the cavities 37 in the droplet-discharge head 15.

On the top side of the cavities 37 are provided a vibrating plate 39 that vibrates vertically (in the Z direction) to enlarge and reduce the internal capacity of the cavities 37, and piezoelectric elements 40 that lengthen and contract vertically to vibrate the vibrating plate 39. The piezoelectric elements 40 lengthen and contract vertically to apply pressure to and vibrate the vibrating plate 39, and the vibrating plate 39 enlarges and reduces the internal capacity of the cavities 37 to apply pressure to the cavities 37. The internal pressure of the cavities 37 thereby fluctuates, and the functional liquid 38 supplied to the cavities 37 is discharged through the nozzles 36.

When the droplet-discharge head 15 receives a nozzle drive signal for controllably driving the piezoelectric elements 40, the piezoelectric elements 40 extend and the vibrating plate 39 reduces the internal capacity of the cavities 37. As a result, an amount of functional liquid 38 proportionate to the reduced capacity is discharged as droplets 41 from the nozzles 36 of the droplet-discharge head 15.

Figure 3:
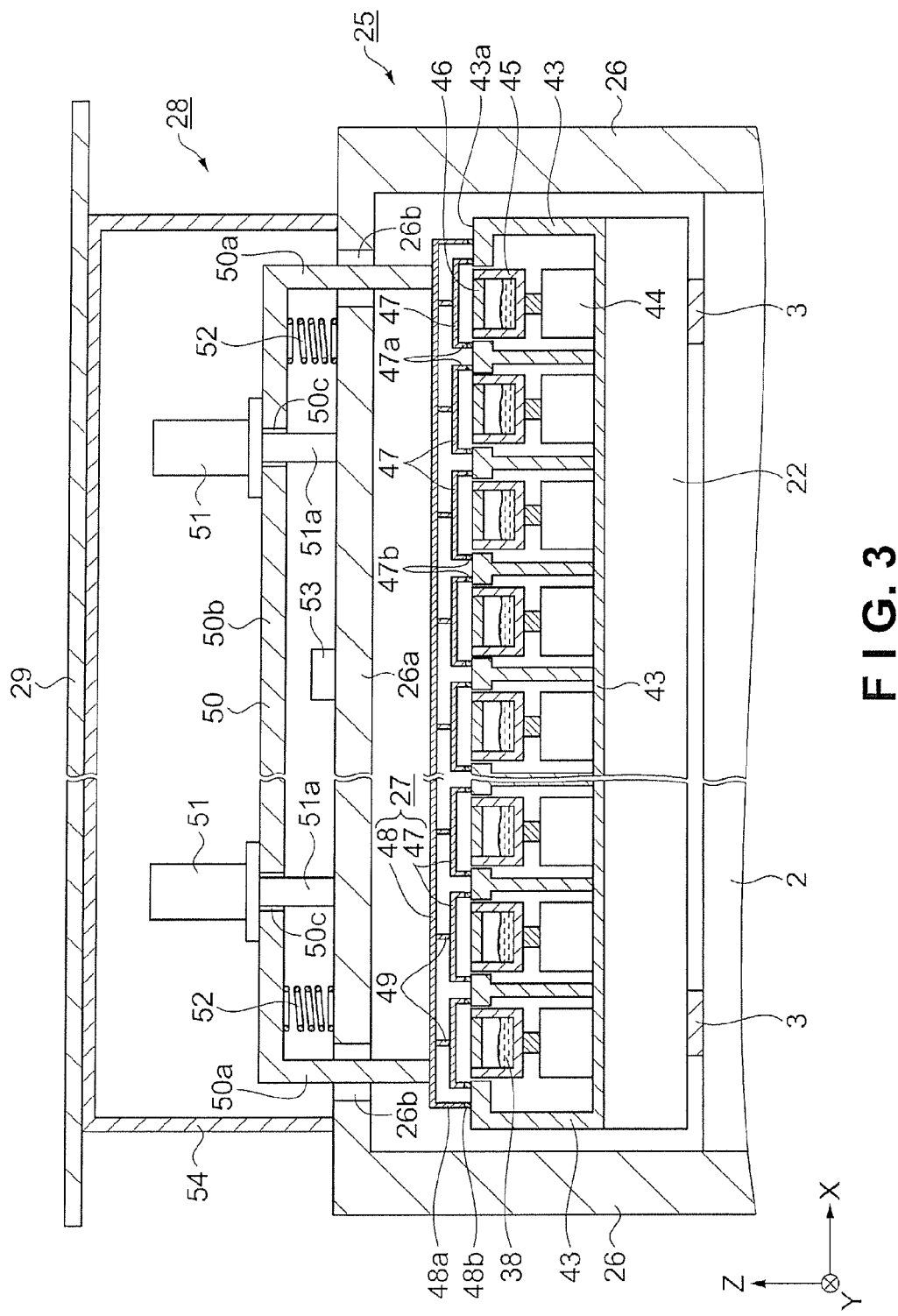
FIG. 3 is a partial schematic cross-sectional view showing the structure of the weight measurement device when wind-guard covers are placed in a proximal position with respect to containers according to the first embodiment.
Figure 4:
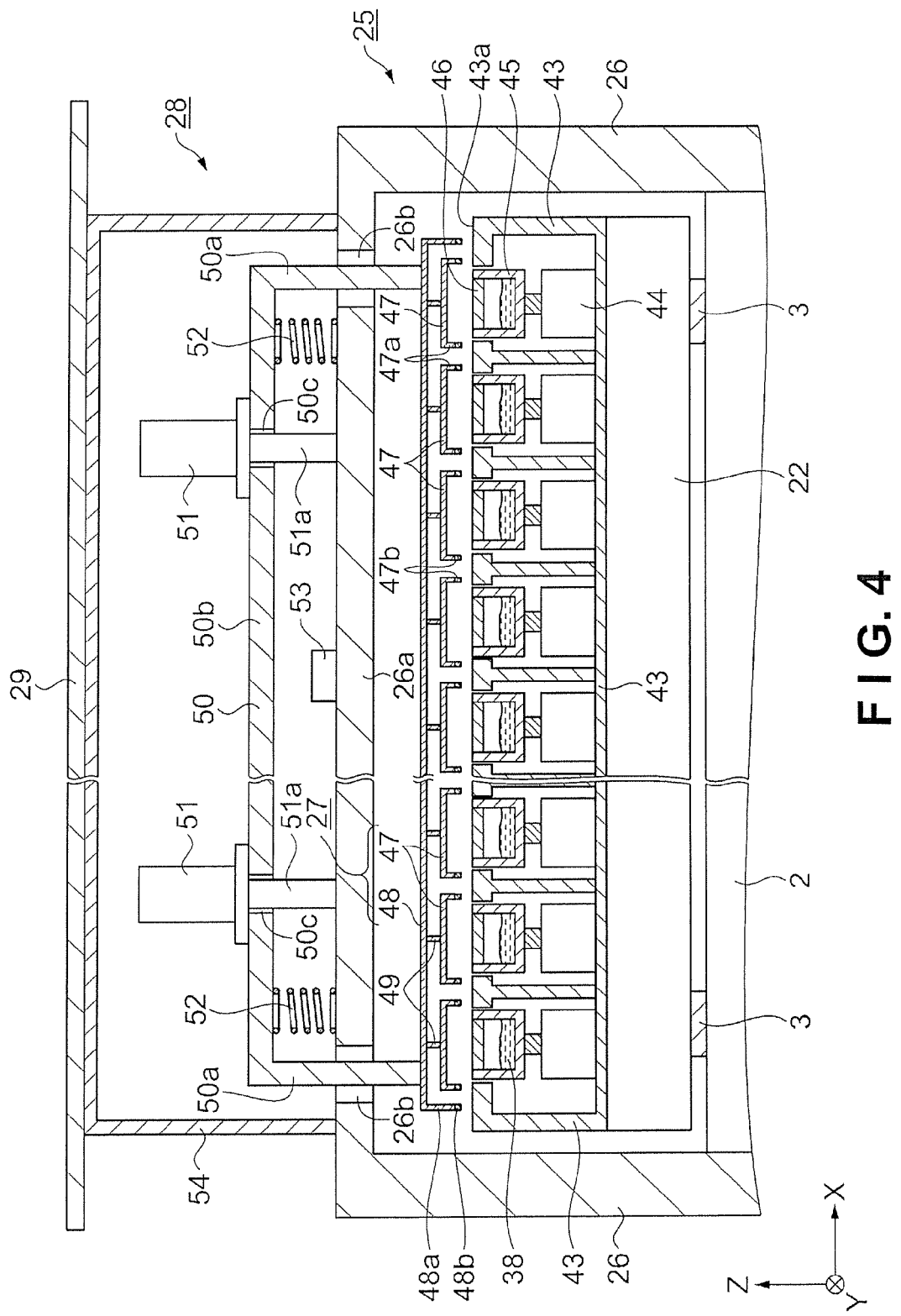
FIG. 4 is a partial schematic cross-sectional view showing the structure of the weight measurement device when the wind-guard covers are placed in a remote position with respect to the containers according to the first embodiment.

FIGS. 3 and 4 are partial schematic cross-sectional views showing the structure of the weight measurement device. FIG. 3 shows a state in which the wind-guard cover 27 is placed in the proximal position to cover the catch pans 45 of the weight measurement device 25, and FIG. 4 shows a state in which the wind-guard cover 27 is separated from the catch pans 45 in the remote position. The weight measurement device 25 has a substantially rectangular box-shaped support part 43 disposed on top of the maintenance stage 22, as shown in FIG. 3. The electronic scales 44 are disposed inside the support part 43, and the catch pans 45 as containers are disposed on the top sides of the electronic scales 44. The catch pans 45 are substantially rectangular box-shaped containers composed of side surfaces and bottom surfaces, and absorptive elements 46 are disposed on the top surfaces of the catch pans 45. The electronic scales 44 are configured and arranged to measure the weight of functional liquid 38, which is a combination of functional liquid 38 in the catch pans 45 and functional liquid 38 absorbed in the absorptive elements 46.

Holes are formed in the locations where the catch pans 45 are disposed in the top surface 43a, which serves as a cover receiving part for the support part 43. The functional liquid 38 can therefore enter into the catch pans 45 through the absorptive elements 46. Individual wind-guard covers 47 are disposed at locations opposite the catch pans 45 on the top sides of the catch pans 45. A plurality of transverse air-blocking parts 47a is formed on the peripheries of the individual wind-guard covers 47. The transverse air-blocking parts 47a are configured and arranged to block the flow of air in the X and Y directions. A plurality of end parts 47b as elastic parts facing the support part 43 is formed from elastic members in the transverse air-blocking parts 47a. The material for the elastic members can be an elastic and durable material, and silicone rubber, for example, is used in the present embodiment. Therefore, when the end parts 47b come into contact with the top surface 43a of the support part 43, the vibration is not readily transmitted to the support part 43 even in cases in which the air flow strikes and vibrates the wind-guard covers 47.

Since an individual wind-guard cover 47 is disposed over each catch pan 45, sixteen individual wind-guard covers 47 are provided, similar to the electronic scales 44. An overall wind-guard cover 48 is disposed over the top sides of the individual wind-guard covers 47, and the overall wind-guard cover 48 is disposed so as to cover the sixteen individual wind-guard covers 47 and the catch pans 45. The overall wind-guard cover 48 has a transverse air-blocking part 48a formed on the periphery, similar to the individual wind-guard covers 47. An end part 48b as an elastic part facing the support part 43 is formed from an elastic member in the transverse air-blocking part 48a. Therefore, when the end part 48b comes into contact with the top surface 43a of the support part 43, the vibration is not readily transmitted to the support part 43 even in cases in which the air flow strikes and vibrates the overall wind-guard cover 48.

The individual wind-guard covers 47 and the overall wind-guard cover 48 are connected by support parts 49. The individual wind-guard covers 47 and the overall wind-guard cover 48 are designed to move in conjunction with each other. Therefore, the overall wind-guard cover 48 is designed to cover all of the catch pans 45 when the individual wind-guard covers 47 cover the catch pans 45. The support parts 49 are formed from rubber or another elastic material. The vibration is not readily transmitted to the individual wind-guard covers 47 even in cases in which the air flow comes into contact with and vibrates the overall wind-guard cover 48. Therefore, the air in the spaces covered by the individual wind-guard covers 47 does not readily vibrate.

A substantially gate-shaped support part 50 is disposed on the top surface of the overall wind-guard cover 48. The support part 50 is configured from two rod-shaped sliding parts 50a extending in the Z direction, and a bridge part 50b formed so as to span the distance between the sliding parts 50a. The sliding parts 50a pass through the centers of two bearing parts 26b formed in the bridge part 26a of the support stand 26. The sliding parts 50a of the support part 50 slide with the bearing parts 26b, allowing the support part 50 to move in the Z direction.

Two air cylinders 51 are disposed on the bridge part 50b of the support part 50. The air cylinders 51 each have a movable shaft 51a, and the movable shafts 51a pass through holes 50c formed in the support part 50. The distal ends of the movable shafts 51a are arranged to be connected to the bridge part 26a of the support stand 26. Tubes (not shown) are connected to the air cylinders 51. When compressed air is supplied through the tubes, the movable shafts 51a contract and the bridge part 50b of the support part 50 comes into proximity of the bridge part 26a of the support stand 26. Coil springs 52 as elastic members are disposed near the air cylinders 51 and between the bridge part 50b of the support part 50 and the bridge part 26a of the support stand 26, and the coil springs 52 urge the bridge part 50b and the bridge part 26a away from each other. Since the coil springs 52 extend when the compressed air supplied to the air cylinders 51 is discharged, the bridge part 50b of the support part 50 and the bridge part 26a of the support stand 26 separate from each other.

A proximity sensor 53 is disposed on the top side of the bridge part 26a of the support stand 26 at a location that faces the bridge part 50b of the support part 50. The proximity sensor 53 senses the distance between the proximity sensor 53 and the bridge part 50b of the support part 50. The proximity sensor 53 is configured and arranged to detect whether the bridge part 50b of the support part 50 and the bridge part 26a of the support stand 26 are in proximity of each other or are separated from each other. The wind-guard cover drive device 28 is configured from the air cylinders 51, the coil springs 52, the proximity sensor 53, and other components. A cover 54 is disposed on the top side of the bridge part 26a of the support stand 26 so as to cover the support part 50 and the air cylinders 51. The windbreak part 29 is disposed on the top surface of the cover 54.

When the compressed air supplied to the air cylinders 51 is discharged, the coil springs 52 extend, as shown in FIG. 4. Since the support part 50 then moves upward, the overall wind-guard cover 48 and the individual wind-guard covers 47 rise. The overall wind-guard cover 48 and the individual wind-guard covers 47 move away from the support part 43, and the maintenance stage 22 can therefore move along the guide rails 3.

Figure 5:
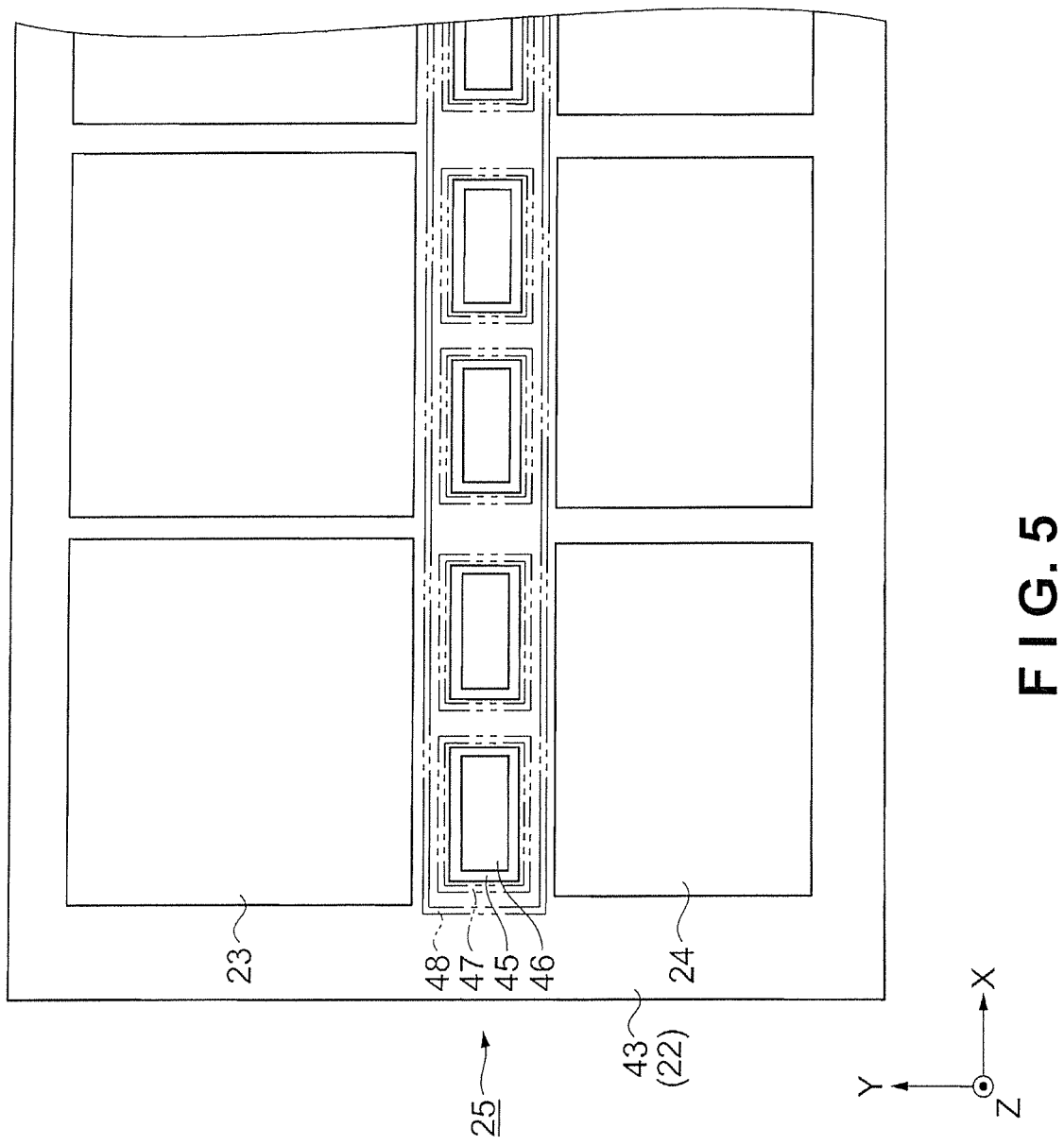
FIG. 5 is a schematic plan view showing a maintenance stage according to the first embodiment.

FIG. 5 is a schematic plan view showing the maintenance stage. The catch pans 45 are disposed in alignment in the middle of the support part 43, as shown in FIG. 5. The first flushing unit 23 and the second flushing unit 24 are disposed on both sides of the catch pans 45 in the Y direction of the catch pans 45. The individual wind-guard covers 47 and the overall wind-guard cover 48 are depicted in the drawing by the double-dashed lines. The individual wind-guard covers 47 and the overall wind-guard cover 48 are disposed so as to cover the catch pans 45. The individual wind-guard covers 47 and the overall wind-guard cover 48 are also disposed at locations where the covers are not in contact with the catch pans 45, the first flushing unit 23, or the second flushing unit 24. Therefore, since the functional liquid 38 does not readily adhere to the individual wind-guard covers 47 and the overall wind-guard cover 48, the individual wind-guard covers 47 and the overall wind-guard cover 48 do not readily corrode even when the functional liquid 38 is a corrosive liquid.

FIG. 6 is an electric control block diagram of the droplet discharge device. In FIG. 6, the droplet discharge device 1 has a CPU (central processing unit) 58 as a processor for performing various computations, and memory 59 for storing various types of information.

A main scanning drive device 60, the main scanning position detection device 5, a sub-scanning drive device 61, the sub-scanning position detection device 12, and a head drive circuit 62 are connected to the CPU 58 via an input/output interface 63 and a data bus 64. Furthermore, an input device 65, a display device 66, the wiping unit 18, the capping unit 19, the weight measurement device 25, the first flushing unit 23, and the second flushing unit 24 are also connected to the CPU 58 via the input/output interface 63 and the data bus 64. Similarly, the wind-guard cover drive device 28 for driving the wind-guard cover 27, a maintenance stage drive device 67 for driving the maintenance stage 22, and the main scanning position detection device 5 for detecting the position of the maintenance stage 22 are also connected to the CPU 58 via the input/output interface 63 and the data bus 64. Thus, the CPU 58 preferably constitutes a control device configured to control an operation of the wind-guard cover drive device 28 and to control the weight measurement device 25 to measure the weight of the droplets.

The main scanning drive device 60 is a device for controlling the movement of the stage 4, and the sub-scanning drive device 61 is a device for controlling the movement of the carriage 11. The main scanning position detection device 5 recognizes the position of the stage 4, and the main scanning drive device 60 controls the movement of the stage 4, whereby the stage 4 can be moved to, and stopped at, a desired position. Similarly, the sub-scanning position detection device 12 recognizes the position of the carriage 11, and the sub-scanning drive device 61 controls the movement of the carriage 11, whereby the carriage 11 can be moved to, and stopped at, a desired position. The head drive circuit 62 is a circuit for driving the droplet-discharge heads 15 and outputting a nozzle drive signal for controllably driving the piezoelectric elements 40 of the droplet-discharge heads 15.

The input device 65 is a device for inputting various processing conditions for discharging droplets 41, and, e.g., receiving and inputting coordinates for discharging droplets 41 onto the substrate 7 from an external device (not shown). The display device 66 is a device for displaying processing conditions and operating conditions. The operator uses the input device 65 to perform operations on the basis of information displayed on the display device 66.

The weight measurement device 25 has a plurality of electronic scales 44 and a plurality of catch pans 45 (containers). The weight measurement device 25 is configured and arranged to measure the weight of the droplets 41 discharged by the droplet-discharge heads 15 by measuring the weight of the catch pans 45 for receiving the droplets 41. More specifically, the weight of the catch pans 45 before and after the droplets 41 are discharged is measured, and the measurements are sent to the CPU 58.

The maintenance stage drive device 67 is a device for moving the maintenance stage 22 so that the first flushing unit 23, the second flushing unit 24, and the weight measurement device 25 are located at a position facing the droplet-discharge heads 15. After the main scanning position detection device 5 detects the position of the maintenance stage 22, the maintenance stage drive device 67 moves the maintenance stage 22, whereby specific devices or units can be reliably moved to locations facing the droplet-discharge heads 15.

The memory 59 is a semiconductor memory such as a RAM or ROM, or an external storage device such a hard disk or CD-ROM. Functionally, a storage area is provided for storing program software 68 on which is written a control procedure for the operation of the droplet discharge device 1. Furthermore, a storage area is provided for storing discharge position data 69, which is data on the coordinates of the discharge positions on the substrate 7.

Additionally, a storage area is provided for storing measurement drive data 70 for driving the piezoelectric elements 40 when the weight of the droplets 41 discharged from the nozzles 36 is measured. Furthermore, a storage area is provided for storing weight measurement data 71 for the droplets 41 measured by the weight measurement device 25.

Also provided are a storage area for storing a main scanning displacement by which the substrate 7 moves in the main scanning direction (Y direction), and a sub-scanning displacement by which the carriage 11 moves in the sub-scanning direction (X direction); a storage area that functions as a work area, temporary files, or the like for the CPU 58; and various other storage areas.

The CPU 58 performs control for discharging the functional liquid 38 as droplets 41 at specific positions on the surface of the substrate 7 in accordance with the program software 68 stored in the memory 59. This specific function is achieved by a weight measurement computing section 72 as a control device for performing calculations in order to measure weight. Furthermore, the CPU 58 has a cleaning computing section 73 for calculating the timing for cleaning the droplet-discharge heads 15, and an air guard control computing section 74 as a control device for controlling the timing to move the wind-guard cover 27 up and down.

The CPU 58 also has a discharge computing section 75 and other components for performing calculations for discharging the droplets 41 through the droplet-discharge heads 15. To describe the discharge computing section 75 in greater detail, the discharge computing section 75 has a main scanning control computing section 76 for calculating controls for moving the substrate 7 in scanning mode at a specific speed in the main scanning direction (Y direction). The discharge computing section 75 also has a sub-scanning control computing section 77 for calculating controls for moving the droplet-discharge heads 15 by a specific sub-scanning amount in the sub-scanning direction (X direction). Furthermore, the discharge computing section 75 has various function computing sections such as a nozzle discharge control computing section 78 or the like for performing calculations for controlling which nozzles 36 among the plurality of nozzles 36 in the droplet-discharge heads 15 will be operated to discharge the functional liquid 38.

Weight Measurement Method

Figure 7:
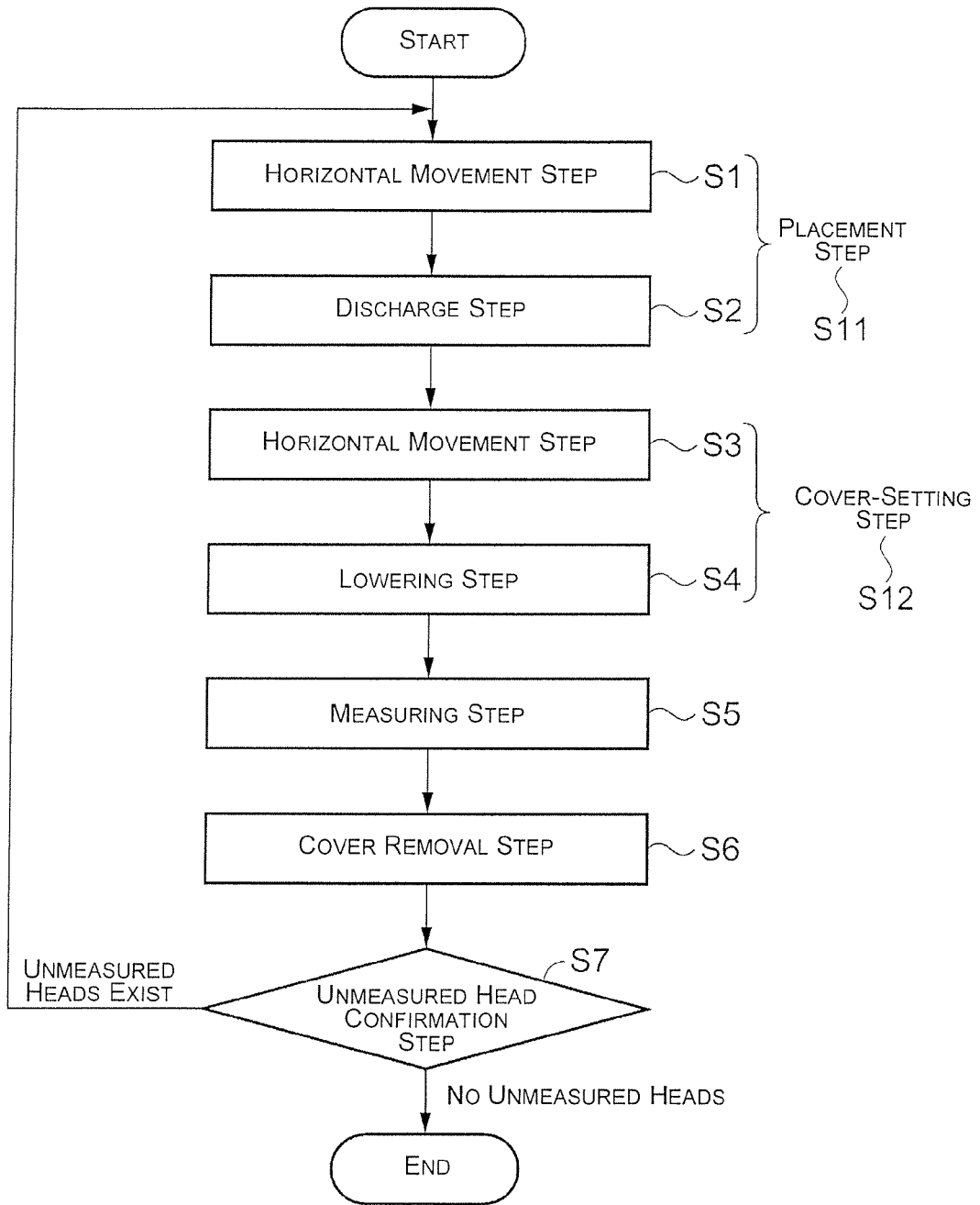
FIG. 7 is a flowchart showing steps for measuring the weight of the functional liquid discharged by the droplet-discharge heads according to the first embodiment.
Figure 8:
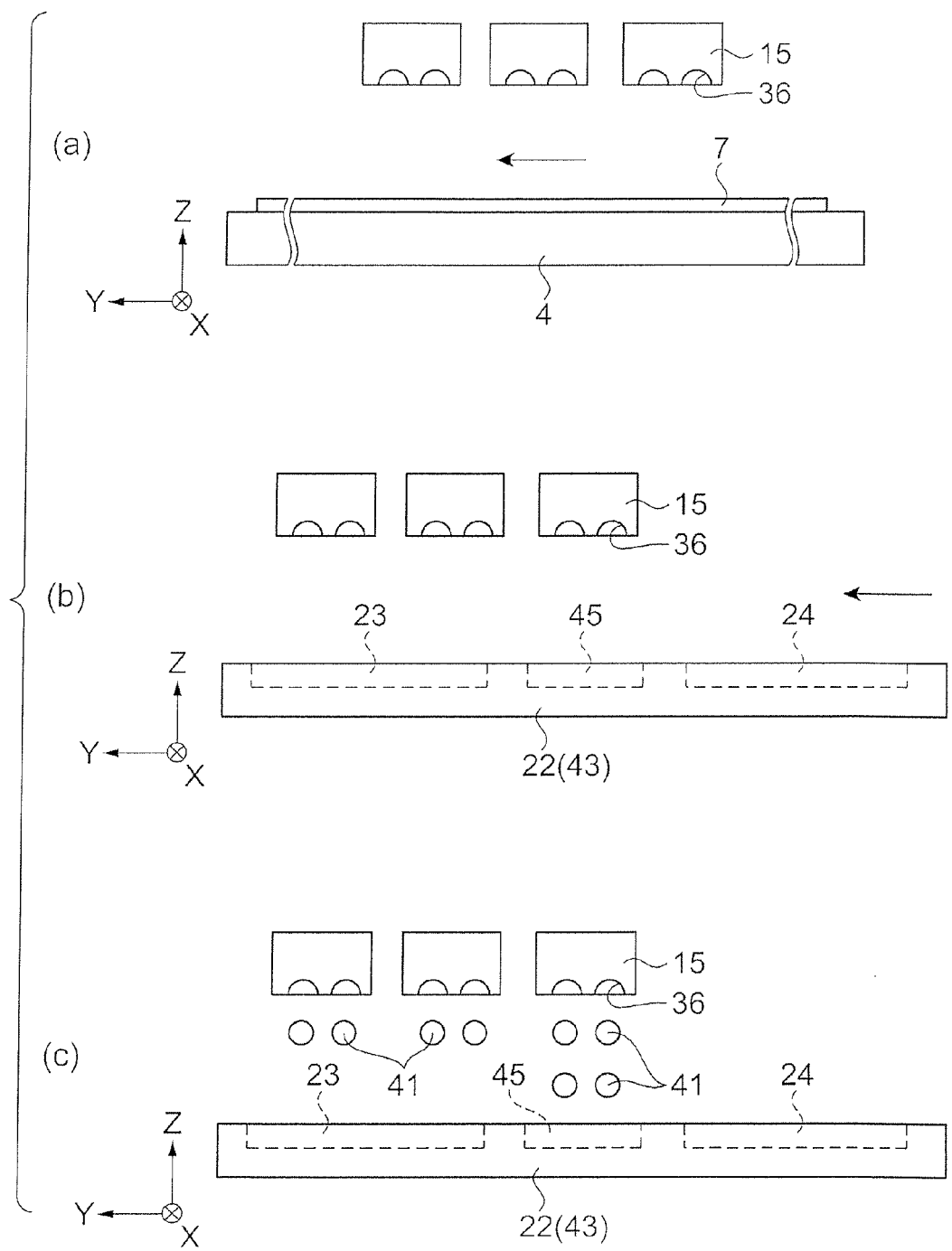
FIG. 8 is a series of diagrams (a) to (c) for describing the method for measuring the weight of the functional liquid discharged by the droplet-discharge heads according to the first embodiment.
Figure 9:
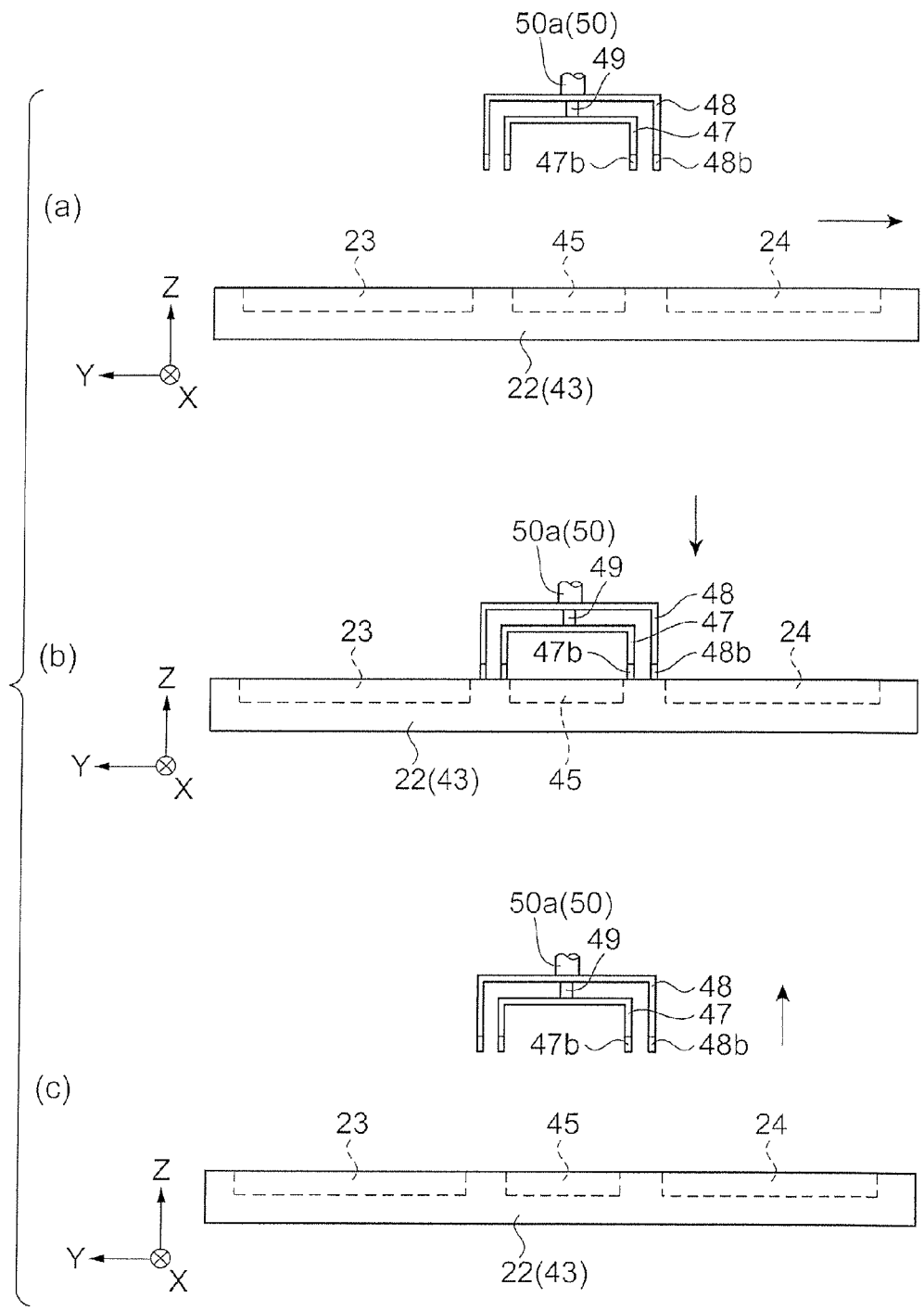
FIG. 9 is a series of diagrams (a) to (c) for describing the method for measuring the weight of the functional liquid discharged by the droplet-discharge heads according to the first embodiment.

The following is a description, made with reference to FIGS. 7 through 9, of the method for measuring the weight of the functional liquid discharged by the droplet-discharge heads, using the droplet discharge device 1 described above. FIG. 7 is a flowchart showing the manufacturing steps for measuring the weight of the functional liquid discharged by the droplet-discharge heads. FIGS. 8 and 9 are drawings for describing the measurement method for measuring the weight of the functional liquid discharged by the droplet-discharge heads.

In the flowchart of FIG. 7, step S1 is a horizontal movement step in which the maintenance stage is moved horizontally to move the weight measurement device to a specific location opposite the droplet-discharge heads. The process then advances to step S2. Step S2 is a discharge step in which droplets are discharged from the droplet-discharge heads onto the catch pans. Step S1 and step S2 together constitute step S11, which is a placement step. In this step, the measurement object is placed in the catch pans. The process then advances to step S3. Step S3 is a horizontal movement step in which the maintenance stage is moved to move the weight measurement device to a location opposite the wind-guard cover. The process then advances to step S4. Step S4 is a lowering step in which the wind-guard cover is lowered to cover the catch pans. Step S3 and step S4 together constitute step S12, which is a cover-setting step. This step is a step for covering the catch pans with the wind-guard cover. The process then advances to step S5. Step S5 is a measurement step for measuring the weight of the catch pans and the weight of the droplets discharged onto the catch pans. The process then advances to step S6. Step S6 is a cover removal step in which the wind-guard cover is raised and the catch pans and wind-guard cover are separated. The process then advances to step S7. Step S7 is an unmeasured head confirmation step in which it is confirmed whether or not there are any droplet-discharge heads that have not been measured. When there are droplet-discharge heads that have not been measured (when there are unmeasured heads), the process advances to step S1. When there are no droplet-discharge heads that have not been measured (when there are no unmeasured heads), the manufacturing steps for measuring the weight of the functional liquid discharged by the droplet-discharge heads are ended.

Next, FIGS. 8 and 9 will be used to give a detailed description of the manufacturing method in accordance with the steps shown in FIG. 7.

FIGS. 8(a) and 8(b) are drawings corresponding to step S1. As shown in FIG. 8(a), droplet-discharge heads 15 are standing by at a location opposite the substrate 7 disposed on the stage 4. To simplify the drawing and make it easier to understand, only three droplet-discharge heads 15 are shown. The stage 4 is then moved away from the location opposite the droplet-discharge heads 15. Next, as shown in FIG. 8(b), the maintenance stage 22 is moved so that one of the droplet-discharge heads 15 is positioned at a location opposite a catch pan 45.

FIG. 8(c) is a view that corresponds to step S2. As shown in FIG. 8(c), droplets 41 are discharged from the nozzle 36 of the droplet-discharge head 15 onto the catch pan 45. The number of discharges can be equivalent to an amount of functional liquid 38 that can be stably measured by the electronic scales 44. In the present embodiment, 1000 discharges are used, for example.

The droplet-discharge heads 15 that are standing by at locations opposite the first flushing unit 23 and second flushing unit 24 discharge droplets 41 at specific time intervals. Difficulty in discharging the droplets 41 is prevented by drying the nozzles 36.

FIG. 9(a) is a view that corresponds to step S3. As shown in FIG. 9(a), the maintenance stage 22 is moved so that one individual wind-guard cover 47 is positioned at a location opposite a catch pan 45. At this time, the end part 47b of the individual wind-guard cover 47 and the end part 48b of the overall wind-guard cover 48 are positioned at locations opposite the support part 43. The position of the maintenance stage 22 is controlled so that the end part 47b and the end part 48b are not positioned at a location opposite the first flushing unit 23, the second flushing unit 24, or the catch pan 45.

FIG. 9(b) is a view that corresponds to steps S4 and S5. As shown in FIG. 9(b), lowering the support part 50 causes the individual wind-guard cover 47 and the overall wind-guard cover 48 to form a lid over the catch pan 45. The air flow that moves around the periphery of the overall wind-guard cover 48 is prevented from coming into contact with the catch pan 45.

Next, the proximity sensor 53 shown in FIG. 3 senses that the individual wind-guard cover 47 and the overall wind-guard cover 48 have moved lower. After the catch pan 45 has been covered by the individual wind-guard cover 47 and the overall wind-guard cover 48, an electronic scale 44 initiates the weight measurement of the catch pan 45. After the electronic scale 44 has measured the weight of the catch pan 45, the weight measurement computing section 72 calculates the weight of the droplets 41 in this one discharge. The CPU 58 then stores the calculated weight measurement data 71 in the memory 59.

FIG. 9(c) is a view that corresponds to step S6. As shown in FIG. 9(c), the wind-guard cover drive device 28 separates the individual wind-guard cover 47 and the overall wind-guard cover 48 from the catch pan 45 by raising the support part 50. The maintenance stage 22 can then be moved.

In step S7, the CPU 58 confirms whether or not the discharged amounts of all the droplet-discharge heads 15 have been measured. Specifically, the CPU 58 confirms whether or not the number of pieces of weight measurement data 71 stored in the memory 59 is the same as the total number of droplet-discharge heads 15. When there are any unmeasured droplet-discharge heads 15, the CPU 58 pinpoints the unmeasured droplet-discharge heads 15. Steps S1 through S6 are repeated and the discharged amounts are measured for the pinpointed unmeasured droplet-discharge heads 15. When there are no unmeasured droplet-discharge heads 15, the manufacturing steps for measuring the weight of the functional liquid 38 discharged by the droplet-discharge heads 15 are ended.

Next, an adjustment step is performed for adjusting the voltage of the nozzle drive signal so that the amount discharged by each droplet-discharge head 15 approaches a target discharge amount. A coating step for discharging droplets 41 from the nozzles 36 to coat the substrate 7 is subsequently performed, and a specific pattern is drawn on the substrate 7. Next, the sprayed functional liquid 38 is dried in a drying step. The substrate 7 having a pattern formed thereon is completed by means of the steps described above.

FIG. 10 is a graph for describing the effect of the transverse air-blocking parts. FIG. 10(a) shows the fluctuation in the weight of the catch pans 45 and droplets 41 measured by the electronic scales 44 when individual wind-guard covers 47 having no transverse air-blocking parts 47a are provided. FIG. 10(b) shows the fluctuation in the weight of the catch pans 45 and droplets 41 measured by the electronic scales 44 when individual wind-guard covers 47 having transverse air-blocking parts 47a are provided.

In FIGS. 10(a) and 10(b), the horizontal axis shows the passage of time 81, and the vertical axis shows the weight 82 measured by the electronic scales 44. In FIG. 10(a), the measured value transition line 83 indicates the transition in the weight 82 measured by the electronic scales 44 immediately after individual wind-guard covers 47 having no transverse air-blocking parts 47a are placed at locations opposite the catch pans 45. The measured value transition line 83 gradually attenuates in amplitude after the individual wind-guard covers 47 are placed in position, and stabilizes after about 15 seconds. The weight measurement computing section 72 measures the weight 82 after the measured value transition line 83 stabilizes.

In FIG. 10(b), the measured value transition line 84 indicates the transition in the weight 82 measured by the electronic scales 44 immediately after individual wind-guard covers 47 having transverse air-blocking parts 47a are placed at locations opposite the catch pans 45. The measured value transition line 84 gradually attenuates in amplitude after the individual wind-guard covers 47 are placed in position, and stabilizes after about 5 seconds. The weight measurement computing section 72 measures the weight 82 after the measured value transition line 84 stabilizes. When the individual wind-guard covers 47 do not have transverse air-blocking parts 47a, the catch pans 45 vibrate readily because the air flow that moves between the individual wind-guard covers 47 and the catch pans 45 comes into contact with the catch pans 45. When the individual wind-guard covers 47 have transverse air-blocking parts 47a, the catch pans 45 do not readily vibrate because there is no entry of the air flow that moves between the individual wind-guard covers 47 and the catch pans 45. The value measured by the electronic scales 44 stabilizes more rapidly when there are transverse air-blocking parts 47a than when there are no transverse air-blocking parts 47a. Furthermore, fluctuation is smaller in the stabilized measured value, and more precise measurement is possible.

According to the present embodiment, the following effects are achieved as described above.

(1) According to the present embodiment, the individual wind-guard covers 47 have transverse air-blocking parts 47a. In the catch pans 45, the individual wind-guard covers 47 prevent the air flow that moves in the direction of gravitational acceleration from coming into contact with the catch pans 45. Furthermore, the transverse air-blocking parts 47a block the flow of gases, whereby the moving air flow is prevented from coming into contact with the catch pans 45 from the side surfaces. Therefore, the weight measurements of the functional liquid 38 are prevented from being caused to fluctuate by the contact of a moving air flow with the catch pans 45. As a result, the weight of the functional liquid 38 can be accurately measured. The term "an air flow that moves from a side surface" and the term "air flow flowing in a transverse direction with respect to the container" refers to an air flow that moves in a direction substantially orthogonal to the direction of gravitational acceleration (direction of gravity).

(2) According to the present embodiment, the wind-guard cover drive device 28 moves the individual wind-guard covers 47 and the catch pans 45 away from each other by raising the individual wind-guard covers 47. Therefore, there is no sliding of the catch pans 45 and individual wind-guard covers 47, and the catch pans 45 therefore do not rub against the individual wind-guard covers 47 and do not vibrate. As a result, it is possible to prevent the catch pans 45 from vibrating and the weight measurements of the functional liquid 38 from fluctuating. As a result, the weight of the measurement object can be accurately measured.

(3) According to the present embodiment, the weight of the catch pans 45 and the droplets 41 is measured after the wind-guard cover drive device 28 uses the proximity sensor 53 to sense that the individual wind-guard covers 47 are in proximity to the catch pans 45. Therefore, since the measurement object is measured after a moving air flow is prevented from coming into contact with the catch pans 45, it is possible to prevent the catch pans 45 from being vibrated by an air flow, and thus, it is possible to prevent the weight measurements from fluctuating. As a result, the weight of the discharged droplets 41 can be accurately measured.

(4) According to the present embodiment, the air cylinders 51 urge the wind-guard cover 27 and the catch pans 45 towards each other. When the pressure of the gas supplied to the air cylinders 51 decreases, the coil springs 52 urge the wind-guard cover 27 and the catch pans 45 away from each other. The wind-guard cover 27 and the catch pans 45 separate from each other when the pressure of the gas supplied to the air cylinders 51 decreases. The wind-guard cover 27 and catch pans 45 remain separated from each other even when the maintenance stage 22 moves, and the wind-guard cover 27 and catch pans 45 can therefore be prevented from coming into contact and being damaged.

(5) According to the present embodiment, end parts 47b and an end part 48b are disposed between the individual wind-guard covers 47 and the support part 43, and between the overall wind-guard cover 48 and the support part 43. The end parts 47b and the end part 48b come into contact with the cover receiving part when the individual wind-guard covers 47 and the overall wind-guard cover 48 come in proximity to the support part 43. At this time, the support part 43 is prevented from vibrating because of the deformation in the end parts 47b and the end part 48b. The catch pans 45 are prevented vibrating due to transmission of the vibration of the support part 43 to the catch pans 45, and the weight measurements of the functional liquid 38 are prevented from fluctuating. As a result, the weight of the functional liquid 38 can be accurately measured.

(6) According to the present embodiment, an air flow that moves towards the wind-guard cover 27 comes into contact with the windbreak part 29, whereby the speed of the air flow is reduced. Therefore, the speed of the air flow that comes into contact with the wind-guard cover 27 can be reduced in comparison with a case in which there is no windbreak part 29. Vibration of the containers can be inhibited because the air flow that comes into contact with the wind-guard cover 27 is further slowed down. Therefore, since it is possible to prevent the catch pans 45 from vibrating and the weight measurements of the measurement object from fluctuating, the weight of the functional liquid 38 can be accurately measured.

(7) According to the present embodiment, since a temperature-adjusted gas flows to the periphery of the weight measurement device 25, the temperature of the weight measurement device 25 can be managed. Therefore, since the weight measurement device 25 measures the weight of the droplets 41 in a state not easily affected by temperature, the weight of the functional liquid 38 can be accurately measured.

(8) According to the present embodiment, covering a plurality of catch pans 45 with one overall wind-guard cover 48 allows the catch pans 45 to be covered by a smaller number of overall wind-guard covers 48 than the number of catch pans 45. As a result, a simple configuration can be achieved.

(9) According to the present embodiment, one catch pan 45 is covered by an individual wind-guard cover 47 and an overall wind-guard cover 48. Therefore, a moving air flow can be made less likely to come into contact with the catch pans 45, as opposed to a case in which one catch pan 45 is covered by one wind-guard cover selected from among the individual wind-guard covers 47 and the overall wind-guard cover 48. As a result, the weight measurement device 25 can perform measurements without being affected by the moving air flow, and the weight of the functional liquid 38 can be accurately measured.

(10) According to the present embodiment, droplets 41 are discharged onto the catch pans 45 after the wind-guard cover 27 is moved away from the upper spaces of the catch pans 45, and the droplets 41 are therefore readily discharged onto the catch pans 45. Accordingly, the weight of the droplets 41 can be measured more easily. The term "upper space" as used herein refers to a space at a location adjacent to the container in a direction substantially opposite to the direction of gravitational acceleration in relation to the container.

(11) According to the present embodiment, since the maintenance stage 22 moves the weight measurement device 25 to a location opposite the droplet-discharge heads 15, the weight of the discharged droplets 41 can be measured in a simple manner after the droplets 41 are discharged onto the catch pans 45.

(12) According to the present embodiment, droplets 41 are discharged onto the first flushing unit 23 and the second flushing unit 24 from the standby droplet-discharge heads 15. It is then possible to prevent part of the functional liquid 38 in the nozzles 36 of the droplet-discharge heads 15 from evaporating, and the viscosity of the functional liquid 38 from increasing. Furthermore, since the catch pans 45 are in proximity to the first flushing unit 23 and the second flushing unit 24, the droplet-discharge heads 15 can be moved to a location opposite the catch pans 45, and measurement can be initiated before the functional liquid 38 increases in viscosity.

(13) According to the present embodiment, the end parts 47b of the individual wind-guard covers 47 and the end part 48b of the overall wind-guard cover 48 are brought in proximity to, or into contact with, locations on the support part 43 other than the first flushing unit 23, the second flushing unit 24, and the catch pans 45, whereby functional liquid 38 is made less likely to adhere to the end parts 47b and the end part 48b. Therefore, the functional liquid 38 can be prevented from corroding the end parts 47b and the end part 48b.

(14) According to the present embodiment, in the cover-setting step of step S12, gas flowing from the top and the side surfaces toward the catch pans 45 is covered by the wind-guard cover 27. Therefore, the weight measurements of the functional liquid 38 are prevented from fluctuating as a result of flowing gas coming into contact with the catch pans 45. As a result, the weight of the functional liquid 38 can be accurately measured.

Second Embodiment

Figure 11:
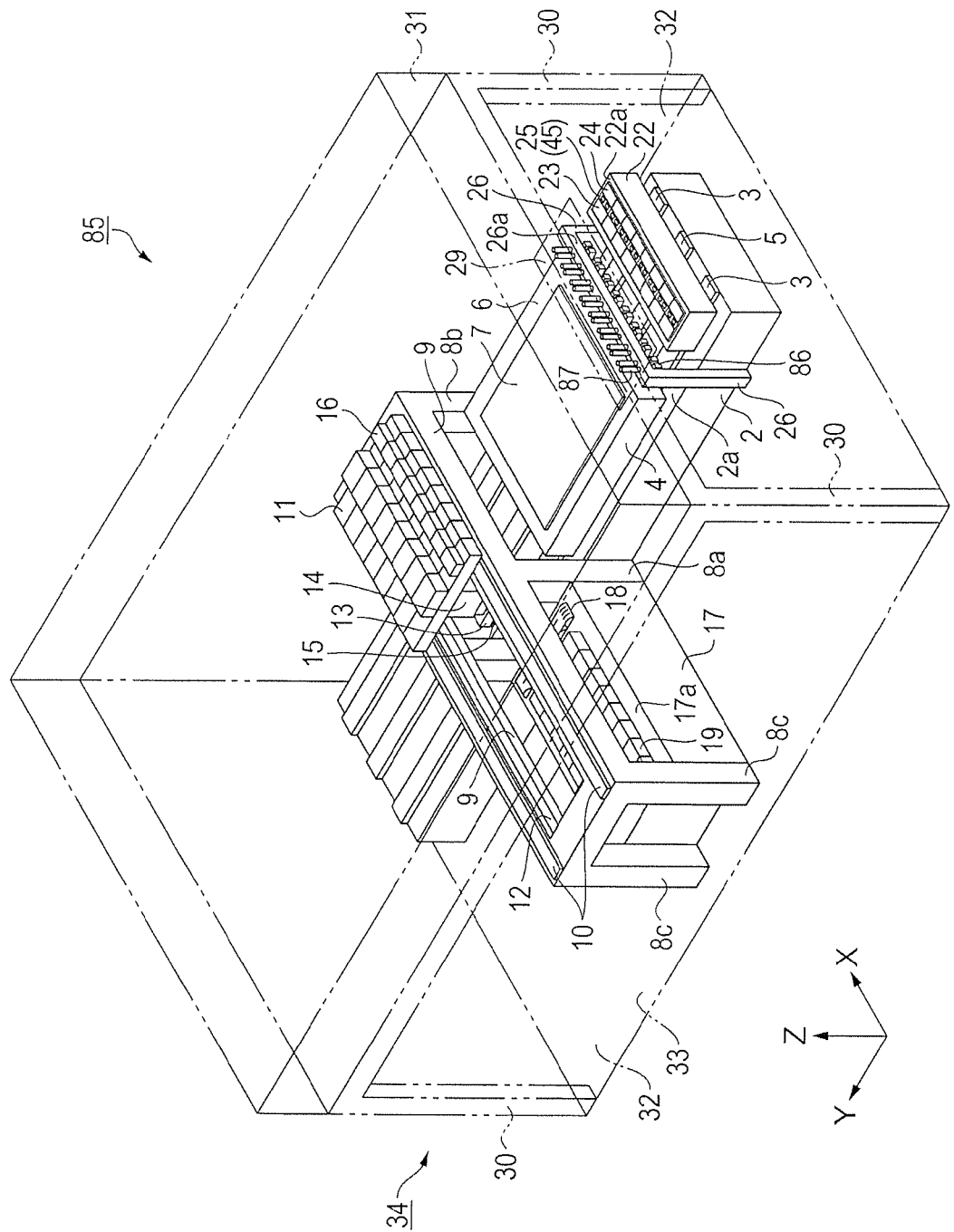
FIG. 11 is a schematic perspective view showing the configuration of a droplet discharge device according to a second embodiment.

Referring now to FIG. 11, a droplet discharge device 85 in accordance with a second embodiment will now be explained. In view of the similarity between the first and second embodiments, the parts of the second embodiment that are identical to the parts of the first embodiment will be given the same reference numerals as the parts of the first embodiment. Moreover, the descriptions of the parts of the second embodiment that are identical to the parts of the first embodiment may be omitted for the sake of brevity.

The second embodiment differs from the first embodiment in that a plurality of wind-guard covers 86 are driven separately.

Specifically, in the second embodiment, the droplet discharge device 85 has the same number of the individual wind-guard covers 86 as the number of the catch pans 45, as shown in FIG. 11. The individual wind-guard covers 86 each have a wind-guard cover drive device 87, which controls the raising and lowering of the corresponding one of the individual wind-guard covers 86. The maintenance stage 22 is moved to move the catch pans 45 to a location opposite the individual wind-guard covers 86. The wind-guard cover drive devices 87 are driven to lower the individual wind-guard covers 86, and the weight of the catch pans 45 and the droplets 41 is then measured. At this time, weight measurement can be performed without being affected by a moving air flow.

As described above, according to the present embodiment, the following effects are achieved.

(1) According to the present embodiment, one individual wind-guard cover 86 covers one catch pan 45, whereby each individual wind-guard cover 86 can be formed to a shape corresponding with the shape of the catch pan 45. The individual wind-guard covers 86 can then reliably cover the catch pans 45. As a result, the weight measurement device 25 can perform measurements without being affected by a moving air flow, and the weight of the functional liquid 38 can therefore be accurately measured.

(2) According to the present embodiment, since each individual wind-guard cover 86 has a wind-guard cover drive device 87, the distance between the individual wind-guard covers 86 and the catch pans 45 is easily adjusted when the individual wind-guard covers 86 are lowered. Therefore, maintenance can be performed easily.

Third Embodiment

Referring now to FIG. 12, a droplet discharge device 88 in accordance with a third embodiment will now be explained. In view of the similarity between the first, second and third embodiments, the parts of the third embodiment that are identical to the parts of the first or second embodiment will be given the same reference numerals as the parts of the first or second embodiment. Moreover, the descriptions of the parts of the third embodiment that are identical to the parts of the first or second embodiment may be omitted for the sake of brevity.

The third embodiment differs from the first embodiment in that a groove 90b is formed in a support part 90 for supporting a weight measurement device 89, and the end part 47b of the wind-guard cover 47 fits into the groove 90b.

FIGS. 12(a) and 12(b) are partial schematic cross-sectional views showing the structure of the wind-guard covers. Specifically, in the present embodiment, the weight measurement device 89 of the droplet discharge device 88 is provided with grooves 90b formed as recesses or concavities in a top surface 90a, which serves as a cover receiving part in the support part 90 for supporting the electronic scales 44, as shown in FIG. 12(a). The grooves 90b enclose peripheries of the catch pans 45 and are formed into substantially the same shape as the end parts 47b of the individual wind-guard covers 47. The grooves 90b are formed so as to allow the end parts 47b to fit into the grooves 90b, and the end parts 47b fit into the grooves 90b when the individual wind-guard covers 47 are lowered to cover the catch pans 45.

When raised as shown in FIG. 12(b), the individual wind-guard covers 47 move to the top sides of the catch pans 45. The weight measurement device 89 can then be moved in the Y direction by moving the maintenance stage 22.

As described above, according to the present embodiment, the following effects are achieved.

(1) According to the present embodiment, since the end parts 47b of the individual wind-guard covers 47 are inserted into the grooves 90b formed in the support part 90, an air flow that moves toward the individual wind-guard covers 47 does not readily pass between the individual wind-guard covers 47 and the support part 90. Therefore, the air flow does not readily come into contact with the catch pans 45, and the catch pans 45 are not readily vibrated, whereby the weight measurements of the functional liquid 38 are prevented from fluctuating. As a result, the weight of the functional liquid 38 can be accurately measured.

(2) According to the present embodiment, an air flow can be prevented from flowing into the individual wind-guard covers 47 without bringing the individual wind-guard covers 47 into contact with the support part 90. The support part 90 does not readily vibrate because the individual wind-guard covers 47 do not come into contact with the support part 90. As a result, the weight of the functional liquid 38 can be accurately measured.

The present embodiments are not limited to the embodiments described above, and various modifications and improvements can be added. Some examples of the modification are described hereinbelow.

Modification 1

In the first embodiment, the air cylinders 51 were used as the wind-guard cover drive device 28, but the drive method is not limited to this option alone, and other drive methods may be used. Examples that may be used include a translation mechanism using a motor and a ball spring, a translation mechanism using a linear motor, and a translation mechanism using a rack and pinion. The mechanism for moving the wind-guard cover 27 may be used. The same effects can be achieved.

Modification 2

In the first embodiment, the coil springs 52 (elastic members) were used to provide an urging force, but air springs, rubber, plate springs, and other components may also be used to provide urging force.

Modification 3

In the first embodiment, the individual wind-guard cover 47 covered one catch pan 45, but one individual wind-guard cover 47 may cover two or more catch pans 45 simultaneously. The device can be simplified by reducing the number of individual wind-guard covers 47.

Modification 4

In the first embodiment, the end parts 47b of the individual wind-guard covers 47 and the end part 48b of the overall wind-guard cover 48 were formed from an elastic material. Another option is to form the end parts 47b and the end part 48b from a non-elastic material, and to place elastic parts formed from an elastic material at locations opposite the end parts 47b and the end part 48b in the top surface 43a of the support part 43.

Modification 5

In the first embodiment, one catch pan 45 is covered by two wind-guard covers; namely, the individual wind-guard cover 47 and the overall wind-guard cover 48. The present invention is not limited to this option alone, and the catch pans 45 may each be covered using three or more wind-guard covers. The flow of air can be even more reliably prevented from coming into contact with the catch pans 45.

Modification 6

In the third embodiment, grooves 90b corresponding to the individual wind-guard covers 47 were formed, but a groove corresponding to the overall wind-guard cover 48 may also be formed. A moving air flow can be blocked in the overall wind-guard cover 48, similar to the individual wind-guard covers 47.

Modification 7

In the first embodiment, the wind-guard cover drive device 28 raised and lowered the wind-guard cover 27 to cover the weight measurement device 25, but another option is to fix the wind-guard cover 27 in place and to raise and lower the weight measurement device 25. An electronic scale raising/lowering device can be provided for raising and lowering the electronic scales 44, and the catch pans 45 may be covered by the wind-guard cover 27 when the electronic scale raising/lowering device raises the electronic scales 44. The catch pans 45 and the wind-guard cover 27 may separate when the electronic scale raising/lowering device lowers the electronic scales 44. At this time, the wind-guard cover drive device 28 is not installed because the wind-guard cover drive device 28 is not needed. When the wind-guard cover drive device 28 is not disposed on the top side of the wind-guard cover 27, the wind-guard cover 27 is easily detached, and maintenance on the catch pans 45 is therefore easily performed.

In the second embodiment, the individual wind-guard covers 86 may similarly be fixed in place and the weight measurement device 25 may be raised and lowered. An electronic scale raising/lowering device for raising and lowering the electronic scales 44 may be provided to each electronic scale 44. Since only the electronic scales 44 used for measurement are raised and lowered, a device can be obtained that conserves energy in comparison with cases in which all of the electronic scales 44 are raised and lowered.

GENERAL INTERPRETATION OF TERMS

In understanding the scope of the present invention, the term "configured" as used herein to describe a component, section or part of a device includes hardware and/or software that is constructed and/or programmed to carry out the desired function. In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. Finally, terms of degree such as "substantially", "about" and "approximately" as used herein mean a reasonable amount of deviation of the modified term such that the end result is not significantly changed. For example, these terms can be construed as including a deviation of at least ±5% of the modified term if this deviation would not negate the meaning of the word it modifies.

While only selected embodiments have been chosen to illustrate the present invention, it will be apparent to those skilled in the art from this disclosure that various changes and modifications can be made herein without departing from the scope of the invention as defined in the appended claims. Furthermore, the foregoing descriptions of the embodiments according to the present invention are provided for illustration only, and not for the purpose of limiting the invention as defined by the appended claims and their equivalents.

What is claimed is:

1. A droplet discharge device for discharging a liquid material onto a workpiece, the droplet discharge device comprising:
    a droplet discharge head that discharges the liquid material;
    a guide rail that extends in a prescribed direction;
    a stage, on which the workpiece is mounted, that moves on the guide rail along the prescribed direction;
    a maintenance stage that is separate from the stage and moves on the guide rail along the prescribed direction independently of the stage; and
    a weight measurement device disposed on the maintenance stage, the weight measurement device measuring weight of droplets discharged from the droplet discharge head and being able to be disposed at a location opposite the droplet discharge head when the maintenance stage moves along the guide rail.

2. The droplet discharge device according to claim 1, wherein the weight measurement device has an electronic scale and a catch pan disposed on the electronic scale.

3. The droplet discharge device according to claim 2, wherein
the weight measurement device has a wind-guard cover configured and arranged to selectively cover an upper space of the catch pan,
the wind-guard cover has a transverse air-blocking part configured and arranged to block an air flow flowing in a transverse direction with respect to the catch pan.

4. The droplet discharge device according to claim 1, wherein
the weight measurement device has an electronic scale.

5. The droplet discharge device according to claim 1, further comprising
a first flushing unit and a second flushing unit disposed on the sides of the weight measurement device.

* * * * *